United States Patent [19]
Hollenbeck

[11] 3,777,171
[45] Dec. 4, 1973

[54] METHOD AND APPARATUS FOR DETECTING FLAWS IN CONTINUOUS LENGTH TUBULAR GLASS

[75] Inventor: Arthur J. Hollenbeck, Montclair, N.J.

[73] Assignee: Westinghouse Electric Corporation, Pittsburgh, Pa.

[22] Filed: July 26, 1971

[21] Appl. No.: 166,097

[52] U.S. Cl. ........... 250/219 S, 356/239, 250/237 R
[51] Int. Cl. ........................................... G01n 21/32
[58] Field of Search ................... 356/198, 200, 239, 356/240; 250/219 DF, 223 B, 237 R

[56] References Cited
UNITED STATES PATENTS

| | | | |
|---|---|---|---|
| 3,565,536 | 2/1971 | Wuellner et al. | 356/239 |
| 3,199,401 | 8/1965 | Sleighter et al. | 356/239 X |
| 3,361,025 | 1/1968 | Gaffard | 356/239 X |
| 3,427,110 | 2/1969 | Mansour | 356/239 |
| 3,574,469 | 4/1971 | Emerson | 250/219 X DF |
| 3,578,869 | 5/1971 | Irland | 250/219 X DF |
| 3,394,263 | 7/1968 | Baker | 356/240 X |

*Primary Examiner*—Walter Stolwein
*Attorney*—A. T. Stratton et al.

[57] ABSTRACT

A method and apparatus for the detection of flaws caused by foreign matter and non-homogeneous bits of glass in the wall of continuous length tubular glass which comprises; directing a pair of narrow band high intensity laser beams, spaced 90° from each other about the axis of the glass tubing, through the tubing to impinge upon planar surfaces along a line immediately adjacent elongated slots in the planar surfaces. The passage of flow containing glass through the laser beams cause one or both of the beams to be deformed and fall on its adjacent slot to thereby activate a photocell positioned behind the slot and provide indicia of the presence and location of the flaw.

4 Claims, 3 Drawing Figures

PATENTED DEC 4 1973  3,777,171

INVENTOR
Arthur J. Hollenbeck
BY
Blair R. Studebaker
ATTORNEY

METHOD AND APPARATUS FOR DETECTING FLAWS IN CONTINUOUS LENGTH TUBULAR GLASS

BACKGROUND OF THE INVENTION

Glass tubing used for fluorescent lamps must be reasonably free of surface defects in order to permit the lamp to be coated with phosphor and this coating must be of uniform thickness and quality throughout the lamp. Surface defects in the glass tubing affect the phosphor coating quality in that during the coating process, which requires that the phosphor coating be flushed down the tube wall, surface defects in the wall of the glass tubing will interrupt the uniform flow and distribution of the coating and hence cause a substandard lamp to be produced. If the defect is not detected between the drawing process and the coating process substantial amounts of comparatively expensive phosphor will be lost when the imperfect lamp is scrapped.

The principal kinds of surface defects found in glass tubing are known in the art as stones and knots. A stone is a small piece of foreign matter as for example a small piece of fire brick from the furnace being embedded in the glass tubing. Knots, on the other hand, are formed from non-homogeneous bits of glass embedded in the tubing wall which because of their composition have failed to melt completely in the furnace and are retained in the glass tubing in their original condition.

Under optimum conditions every material stone and knot should be detected while the glass is being cooled as it travels in drawn form from the glass furnace as continuous length tubing to the cutting station where it is cut to predetermined lamp lengths. If these deleterious stones and knots are detected the glass cutting machine can be programmed, in response to the sensing of a stone or knot, to reject the defective length of tubing and return it to the melting furnace or alternatively to cut a small section of glass containing the stone or knot from the tubing intermediate the cutting of the predetermined lengths of lamp size.

Many kinds of detectors have been tried to automatically sense the presence of a stone or knot and separate the stone and knot free tubing from the defective lengths of tubing. These detectors have in general been based on the principle that the average change in light flux passing through the tubing in the presence of a stone or knot differs from the clear tubing. These systems have only limited sensitivity and the only effective method of inspection heretofore has been the use of one or more human inspectors to closely watch the tubing as it travels from the forming furnace to the cutting operation.

SUMMARY OF THE INVENTION

This invention relates to the detection of stones and knots in fluorescent lamp glass tubing and more particularly to a method and apparatus for consistently and successfully detecting stones and knots of a size deleterious to the production of satisfactory fluorescent lamps.

The foregoing is accomplished and the above described problems obviated by converting the high intensity columnated light beam from a gas laser into a narrow band or line of intensive light and passing the line of light through the tubing perpendicular to the axis of the tubing onto a surface which has a slot therein adjacent to the area upon which the line of intense light falls. As the tubing proceeds through this narrow band or line of intense light a stone or knot embedded in the glass, because the area around the stone or know becomes thicker than the average wall thickness and results in a lense effect, distorts the line of light producing a cross pattern off of the original line and over the slot. A photocell behind the slot will pick up the cross pattern and indicate the presence of a stone or knot. This sensed information can then be used through a time delay circuit to control the cutter and eliminate the defective portion of tubing from that which is converted into fluorescent lamp lengths.

BRIEF DESCRIPTION OF THE DRAWING

Many of the attendant advantages of this invention will become more readily apparent and better understood as the following detailed description of the preferred embodiment is considered in connection with the accompanying drawings in which.

DESCRIPTION OF THE PREFERRED EMBODIMENT

Figure 1:
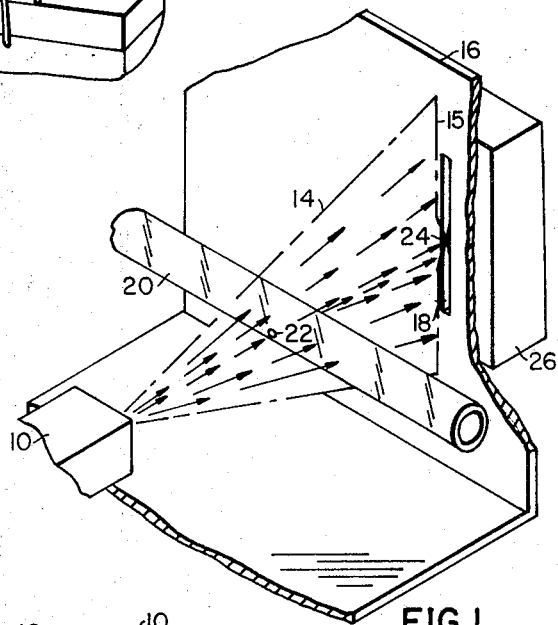
FIG. 1 is a perspective view illustrating the principle of this invention.

Referring now in detail to the drawing wherein like reference characters represent like parts throughout the several views there is illustrated in FIG. 1 the basic concept of this invention. Broadly, the invention involves converting the high intensity columnated laser beam from a gas laser 10 by means of a cylindrical lense 12 (FIG. 3), which is in front of the laser 10 and cannot be seen in FIG. 1, into an extremely narrow band or line of intense light 14 which is projected on a mask or surface 16 which has a slot 18 therein adjacent the line upon which the beam 14 normally falls. The glass tubing 20 which is to be checked for surface defects is then passed through the beam at a predetermined rate of speed and a surface defect in the form of a stone or knot, such as that illustrated at 22 in FIG. 1, will cause the generally straight line projection 15 on the surface 16 to be bowed as illustrated at 24 and be caused to fall on the slot 18. A light sensitive device, as for example the photocell 26, positioned behind the slot will then sense the presence of a defect.

Figure 2:
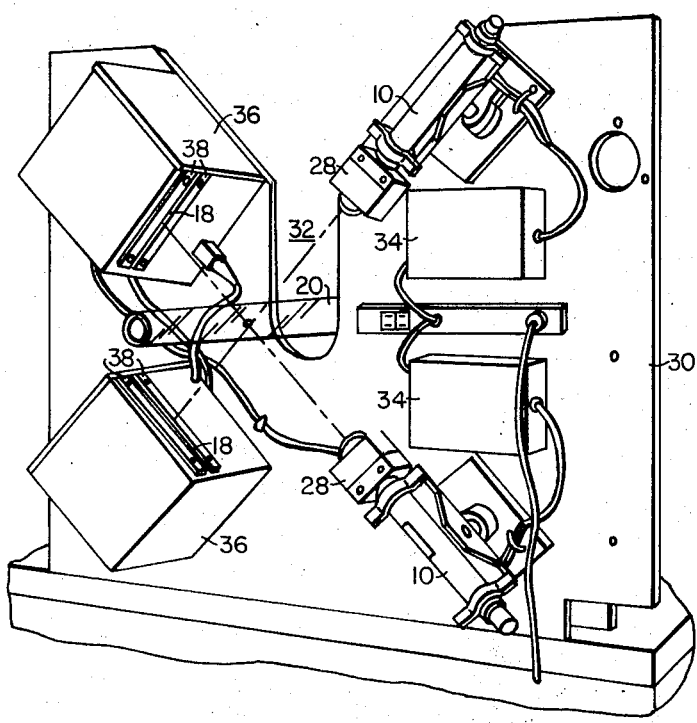
FIG. 2 is a perspective view of apparatus for practicing the preferred embodiment of this invention.
Figure 3:
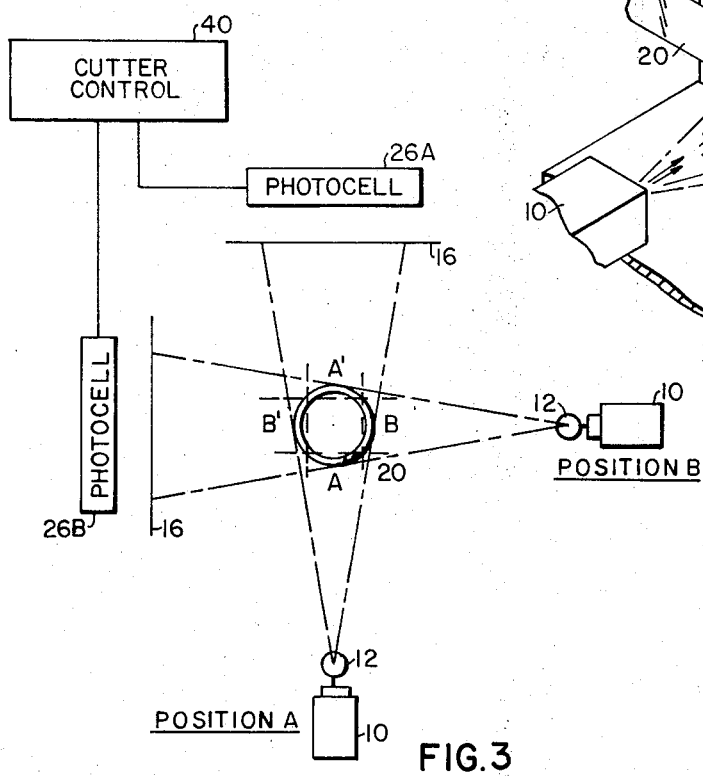
FIG. 3 is a schematic illustration of the principles employed in the embodiment of FIG. 2.

Although defects such as stones or knots can be detected in the wall of a tubular glass member by a single high powered laser beam, in the preferred embodiment of FIG. 2 two helium-neon gas lasers 10 producing a 1/6 inch diameter beam are spaced apart 90° about the axis of the tubular glass 20 to be inspected. The 1/16 inch diameter columnated beam produced by each of the helium-neon lasers is projected through a 1/4 inch diameter cylindrical lense 12 and converted into a strip of high intensity light one-sixteenth inch wide. The cylindrical lenses 12 are mounted to the output ends of the lasers 10 as shown at 28 in FIG. 2. The principle of the embodiment of FIG. 2 is best illustrated in FIG. 3. When the lasers are situated equidistant from the glass tubing 20 at 90° from each other they principally detect stones or knots in two 90° segments of the glass tubing 20. Since the more intense portions of the narrow band of light occur near the center thereof it will be seen that the helium-neon gas laser at position A of FIG. 3 principally detects stones or knots situated in the quadrants A, A' of the glass tubing and the laser 10 at position B principally detects stones or knots situated in the quadrants B, B' of the glass tubing 20. With the use of a pair of spaced lasers as illustrated in FIGS. 2 and 3 lasers of lower intensity may be employed to perform the detection function. Although some indication of the presence of a stone or knot in the quadrants A, A' may be picked up by the photocell 26B based upon the deformation of the beam produced from the laser at position B the equipment principally relies on the photocell at 26A to detect flaws in the quadrants A, A'. It should also be noted that the beam from the laser at position B must traverse more than the normal wall thickness of glass as it passes through the center areas of the quadrants A, A'. This greater than normal glass thickness can obscure a defect from a single laser system.

In practicing this invention in the manufacture of fluorescent lamps, inspection for stones and knots occurs during production of the glass tubing. The glass is drawn from a glass furnace in the form of a continuous length elongated hollow tube and is drawn for a sufficient time and distance to permit the glass to cool to the prescribed diameter. The next step in the production of a fluorescent lamp is to cut this continuous length elongated tubular glass body to specific lengths depending on the type of fluorescent lamp being manufactured. Large amounts of glass can be lost if the continuous elongated tubular glass is cut for example automatically in four foot lengths and coated with phosphor before a stone or knot, present in the four foot length of tubing, is detected. Additionally, a significant amount of valuable phosphor will be lost. This invention permits a stone or knot to be detected and the length of tubing containing that stone or knot to be removed from the production line prior to phosphor coating and be broken up and returned to the furnace, minus the portion containing the stone or knot, for remelting.

The preferred embodiment of this invention, illustrated in FIG. 2, has the elements of the laser detector system mounted on a vertically disposed base 30 which includes an aperture 32 through which the glass tubing, drawn from the glass furnace, travels on its way to the cutting mechanism. The ¼ milliwatt helium-neon lasers may be of a type which is commercially available from Electro Optics Associates, Palo Alto, California designated Model LAS-2000 and which produces a 1/16 inch diameter laser beam. Power to the lasers 10 is controlled by Electro Optics Associates P-104 power supplies 34 which receive a steady voltage of 117 volts from a conventional voltage regulator (not shown). Diametrically opposite each of the lasers across the axial path which the glass tubing 20 travels are a pair of photocell housings 36 which house the photocells 26 at a position to receive any high intensity illumination from the lasers 10 which fall upon the slots 18 in the face of the boxes 36. The slots 18 in the face of each of the housings 36 are defined by opaque masking plates 38 upon one of which the high intensity band or line of light one-sixteenth of an inch width normally falls as the output of the laser and the cylindrical lens traverses satisfactory glass tubing.

When either or both of the laser beams traverse a stone caused by a piece of fire brick or other foreign matter being embedded in the glass or a knot caused by a piece of non-homogeneous glass having found its way into the melt, the build-up of glass around the stone or knot results in a lens effect which distorts the narrow band of light producing a cross pattern off of the line as illustrated in FIG. 1. This crossed pattern will spill over the edges of the masking plates 38 onto the photocell situated behind the slot 18 causing an electrical signal to be produced by the photocell in a conventional manner.

The output of the photocell can be made, through conventional time delay and control circuitry 40, to control an ejection mechanism which will remove the defect containing section of tubing or alternatively to control the cutting operation in a manner which will permit the lengths of tubing containing stones or knots to be cut out in shorter than standard lengths and disposed of with the least practicable loss of glass tubing.

The laser flaw detection apparatus and method of this invention can without difficulty successfully scan rapidly moving glass tubing for purposes of detecting flaws of the stone or knot type in the glass. Tubing traveling at speeds of from between four feet per second and twenty feet per second have been successfully scanned for stones and knots in accordance with the present invention. The sensitivity of the laser beam scanning system is far superior to prior art light detection mechanisms which merely measure the change in light flux passing through the tubing. The apparatus of this invention permits much smaller stones and knots to be detected.

I claim as my invention:

1. The method of detecting flaws caused by foreign matter and non-homogeneous bits of glass embedded in the wall of a continuous length of tubular glass which method comprises the steps of:

projecting a first narrow band of light which falls on a first surface adjacent an aperture to a first photocell;

projecting a second narrow band of light, at right angles to and intersecting said first narrow band of light, onto a second surface adjacent an aperture to a second photocell, said photocells being normally shielded from said narrow bands of light by said surfaces;

passing the continuous length of glass tubing through the intersection of said first and second narrow bands of light at a predetermined speed; and detecting the presence of a flaw in said glass tubing through the deformation of a portion of one or both of said narrow bands of light by said flaw causing said deformed portion to overly one or both of said first and second apertures and reach said adjacent photocell.

2. An apparatus for detecting the flaws caused by foreign matter and non-homogeneous bits of glass in the wall of continuously moving tubular glass, said apparatus comprising:

first laser means for projecting a narrow band of light;

a first planar surface having a slot therein for normally receiving said narrow band of light at a predetermined location adjacent to said slot in said planar surface, second laser means spaced from said first laser means for projecting a narrow band of light at right angles to the narrow band of light projected by said first laser means, a second planar surface having a slot therein for normally receiving said narrow band of light from said second laser means at a predetermined location thereon adjacent to said slot in said second planar surface;

light responsive means situated behind each of said slots normally shielded from said narrow bands of light by said planar surfaces whereby flaws in the wall of said continuously moving tubular glass passing through the intersection of said first and second bands of light from said first and second laser means will cause a deflection in one or both of said narrow bands of light causing said one or both narrow bands of light to spill over the adjacent slot in said planar surfaces and be sensed by said light responsive means.

3. The apparatus according to claim 2 wherein said first and second laser means each include a gas laser for producing a cylindrical beam of columnated light and a cylindrical lens for converting said beam of columnated light to said narrow band of light.

4. The apparatus according to claim 3 wherein each of said gas lasers is a one-quarter milliwatt helium-neon laser.

* * * * *